United States Patent [19]

Mowry

[11] Patent Number: 5,208,715

[45] Date of Patent: May 4, 1993

[54] SHIELD GEOMETRY FOR STABILIZING MAGNETIC DOMAIN STRUCTURE IN A MAGNETORESISTIVE HEAD

[75] Inventor: Gregory S. Mowry, Burnsville, Minn.

[73] Assignee: Seagate Technology, Inc., Scotts Valley, Calif.

[21] Appl. No.: 575,589

[22] Filed: Aug. 31, 1990

[51] Int. Cl.$^5$ .................. G11B 5/11; G11B 5/127; G11B 5/147
[52] U.S. Cl. .................. 360/113; 360/126
[58] Field of Search .......... 360/113, 119–126, 360/128; 428/900; 29/603

[56] References Cited

U.S. PATENT DOCUMENTS

| | | | |
|---|---|---|---|
| 4,242,710 | 12/1980 | Hempstead et al. | 360/126 |
| 4,489,484 | 12/1984 | Lee | 360/113 |
| 4,750,072 | 6/1988 | Takagi | 360/126 |
| 4,803,580 | 2/1989 | Mowry | 360/113 |
| 4,807,074 | 2/1989 | Kamo | 360/113 |
| 4,814,921 | 3/1989 | Hamakawa et al. | 360/126 |
| 4,821,133 | 4/1989 | Mowry et al. | 360/113 |
| 4,843,506 | 6/1989 | Gill et al. | 360/113 |
| 4,900,650 | 2/1990 | Das | 360/126 |
| 4,907,113 | 3/1990 | Mallary | 360/113 |
| 4,912,584 | 3/1990 | Mallary et al. | 360/126 |
| 4,967,298 | 10/1990 | Mowry | 360/113 |
| 5,032,945 | 7/1991 | Argyle et al. | 360/126 |
| 5,085,935 | 2/1992 | Mallary | 360/113 |

Primary Examiner—Stuart S. Levy
Assistant Examiner—Jefferson Evans
Attorney, Agent, or Firm—Kinney & Lange

[57] ABSTRACT

A magnetic shield in a magnetoresistive head. The magnetic shield includes a lip portion adjacent a magnetoresistive element. The magnetic shield has a height equal to an integer multiple of the domain wall periodicity. The lip has a height approximately equal to the periodicity. The total height of the magnetic shield is approximately an integer multiple of the lip portion. The lip portion provides a stabilizing demagnetization effect which returns the magnetic domain pattern to a preferred hard axis magnetic domain pattern following a disruption to the magnetic domain pattern in either the easy or hard axis of the magnetic shield.

15 Claims, 5 Drawing Sheets

SHIELD GEOMETRY FOR STABILIZING MAGNETIC DOMAIN STRUCTURE IN A MAGNETORESISTIVE HEAD

BACKGROUND OF THE INVENTION

The present invention relates to magnetoresistive write/sense heads for magnetic media data storage systems. In particular, the present invention relates to a geometrical configuration of a shield in a magnetoresistive write/sense head.

Magnetoresistive sensors are employed as sense or read transducers in the write/sense heads of some types of magnetic disk drives. The electrical resistance of a magnetoresistive sensor changes depending upon the sensor's proximity to a magnetic field. Additionally, the electrical resistance of a sensor positioned in a magnetic field varies as a function of the strength of the magnetic field. A magnetoresistive sensor positioned above a magnetic data storage disk can be used to sense the magnetic fields associated with localized magnetic domains impressed upon the disk surface. This local magnetic domain represents data which the sensor reads. A magnetoresistive sensor typically comprises a thin layer of ferromagnetic material which exhibits a magnetoresistive effect, such as a nickel iron alloy. The ferromagnetic layer is deposited upon an electrically insulating substrate. Magnetoresistive sensors work best where the active region of the sensor has no magnetic domain boundaries. In other words, the active sense area of the magnetoresistive sensor should be a single domain. The presence of domain boundaries in a sensor gives rise to Barkhausen noise, a phenomena caused by the irreversible motion of magnetic domains in the presence of an applied magnetic field. Barkhausen noise cannot occur if no domain boundaries exist. Typically, a single domain magnetoresistive sensor is achieved after fabrication using a process in which the magnetization is "set" using an external magnetic setting field.

A double-gap magnetoresistive head, such as that described in U.S. Pat. No. 4,803,580 has separate write and sense gaps defined by arranging linearly a top magnetic pole, a middle magnetic pole, and a trailing shield. The top pole, the middle pole, and the trailing shield are all constructed from soft magnetic materials. The write gap is the gap between the top pole and the middle pole and the sense gap is the gap between the middle pole and the trailing shield. The magnetoresistive sensor is positioned in the sense gap between the middle pole and the trailing shield. The magnetoresistive sensor design is of a type which can support a single domain state. The middle pole and the trailing shield operate as shields for the sensor which substantially block the sensor from magnetic fields other than a magnetic field generated by a local magnetic domain positioned directly under the sense gap, such as a magnetic domain on a magnetic disk. The shielding is generally quite effective against the field strength encountered in disk drive operating environments.

The magnetic shield itself contains magnetic domains. The magnetoresistive sensor is positioned between the two magnetic shields. Consequently, the magnetic domain pattern carried by the magnetic shields can affect the operation of the magnetoresistive sensor. It is therefore important to provide a magnetic shield design which stabilizes a desired magnetic domain pattern.

However, during the manufacture of a magnetoresistive head, the head structure is subjected to external magnetic fields. The manufacturing process may subject the head to fields of sufficient magnitude to alter the domain pattern of the shield into an undesired structure. These fields may saturate the magnetic shield in the easy axis direction. Furthermore, the magnetic field generated during a write operation from the inductive magnetic write head associated with the magnetoresistive readback sensor, provides magnetic fields which can destabilize the shield's magnetic domain pattern.

SUMMARY OF THE INVENTION

The present invention provides a geometry for a magnetic thin film material shield which yields a highly stabilized magnetic domain pattern.

It has been found that external magnetic fields such as those applied to a magnetic shield of a magnetoresistive head during manufacture and use, tend to randomize the magnetic domain pattern of the magnetic shield. For example, when magnetic fields of sufficient magnitude are applied to the magnetic shield in its easy axis direction, the magnetic shield can be easily saturated in the easy axis direction. When the external field is reduced to zero, a rectangular shield geometry of the type used in the prior art develops a random, unpredictable and undesired domain structure which interferes with operation of the magnetoresistive head. After manufacture, the magnetoresistive head may also be intentionally subjected to large easy axis magnetic fields during a procedure in which the magnetoresistive sensor is "set" into a single domain state. Additionally, during assembly of a disk drive, a magnetoresistive head (and consequently the magnetic shield associated with the magnetoresistive head) may be subjected to randomly oriented magnetic fields of about 10 Oersteds to about 100 Oersteds, which may further act to destabilize the magnetic shield.

The present invention provides a geometry for the magnetic shield in a magnetoresistive head which yields a stable magnetic domain pattern. Using domain studies and Kerr microscopy, a geometry which provides a highly stable magnetic domain structure has been discovered. In the present invention, the magnetic shield has a generally rectangular shape in which a portion of the shield has been removed proximate the magnetoresistive sensor, so that the magnetic shield is narrower in the region in the magnetoresistive sensor.

A magnetic shield made in accordance with the present invention may be defined using a number of parameters. $W_1$ is the width of the shield along the front edge adjacent to the magnetoresistive sensor. $W_2$ is the width of the shield along the back edge of the shield, i.e. the edge opposite the front edge of the shield. H is the total height of the shield and is the distance between the front edge and the back edge of the shield. L is the height of a lip portion of the shield and is shorter than H. The lip portion of the shield is the portion of the shield adjacent the magnetoresistive sensor which is narrower than the back edge of the shield. In other words, the lip is defined because $W_1$ of the shield is less than $W_2$ of the shield. T is the equilibrium periodicity of the magnetic domain pattern of the magnetic shield. The thickness of the shield is defined by t.

In accordance with the present invention, the above parameters which define the magnetic shield are subject to certain criteria: If $W_1$ and $W_2$ are greater than or equal to about 25 $\mu$m, then the magnetostriction of the shield, $\lambda$, should be greater than or equal to zero and in the range of about 0 to about $0.5 \times 10^{-6}$ in order to limit undesired closure domains at the front and back edges of the magnetic shield. Negative magnetostriction is undesirable, and narrower shield width tends to shift the desired magnetostriction negative. H/T is a small integer, e.g. about one to about ten. L/T is about one. In other words, the height of the lip is about equal to the equilibrium periodicity of the magnetic domain pattern of the magnetic shield. $W_1$ should be greater than or equal to the length of the magnetoresistive sensor which it is shielding. $W_2$ minus $W_1$ is limited by the ability of the thin film process used to define the corner edges of the lip. The thickness of the shield, t, should be greater than 2 μm, and a thicker shield is preferable. In the present invention, because the front edge of the magnetic shield, the lip, is narrow, the demagnetization field arising from an easy axis field, is sufficient to cause the preferred hard axis magnetic domain pattern of the shield to return, even after the shield has been subject to saturation in the easy axis direction.

Using the present invention, it is also possible to stabilize the domain structure of a magnetic pole in a thin film inductive magnetic head. Typically, a back gap region associated with a thin film inductive magnetic head is a cause of instability in a domain pattern of the pole. If a lip is defined at the back gap region of the thin film pole, in accordance with the present invention, the lip will provide a stabilization effect to the magnetic domain pattern associated with the pole. Thus, the lip portion of the pole will help to stabilize the magnetic domain pattern following the occurrence of a destabilizing magnetic event.

DETAILED DESCRIPTION OF THE PREFERRED EMBODIMENTS

Figure 1:
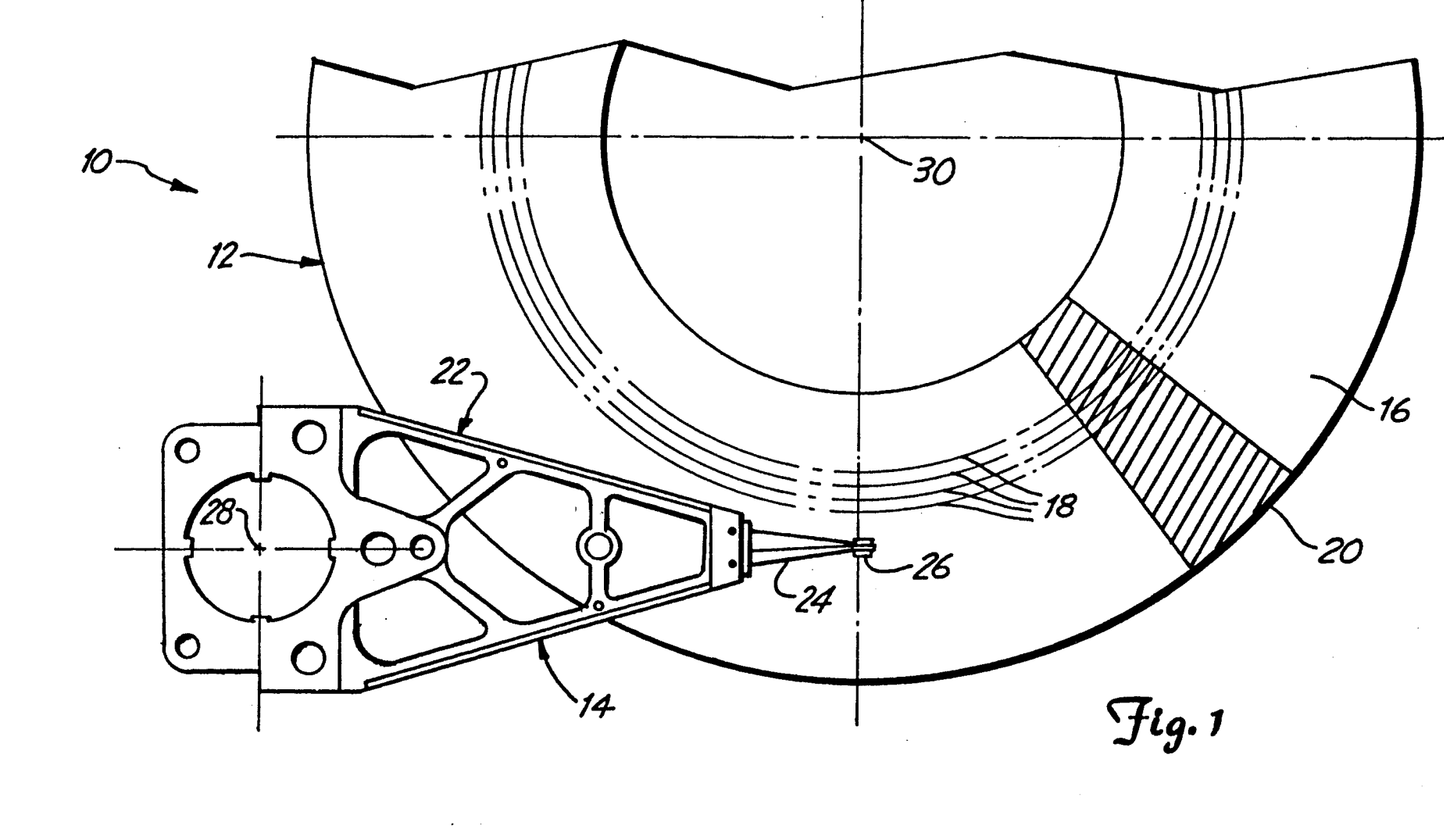
FIG. 1 is a top plan view of a support arm in a magnetic storage system.

FIG. 8 is a top plan view of a magnetic storage system 10, which includes magnetic storage disk 12 and rotary arm 14. Magnetic storage disk 12 includes a surface 16 divided into data tracks 18 and data sectors 20.

Arm 14 includes support arm 22 and flexure arm 24. Flexure arm 24 carries a slider 26 at its distal end. Slider 26 carries a magnetoresistive head (not shown in FIG. 1).

Arm 14 rotates about axis of rotation 28 so that slider 26 moves in a radial fashion across the surface of disk 12. Magnetic disk 12 rotates about an axis of rotation 30.

As magnetic disk 12 rotates, the slider 26, "flies" slightly above the surface 16 of magnetic storage disk 12. Flying height is a function of the aerodynamic properties of slider 26, the rate of rotation of magnetic storage disk 12 and force supplied to slider 26 by the spring-loaded flexure arm 24. By rotating arm 14 about axis of rotation 28, slider 26 moves between adjacent tracks above the surface 16.

Figure 2:
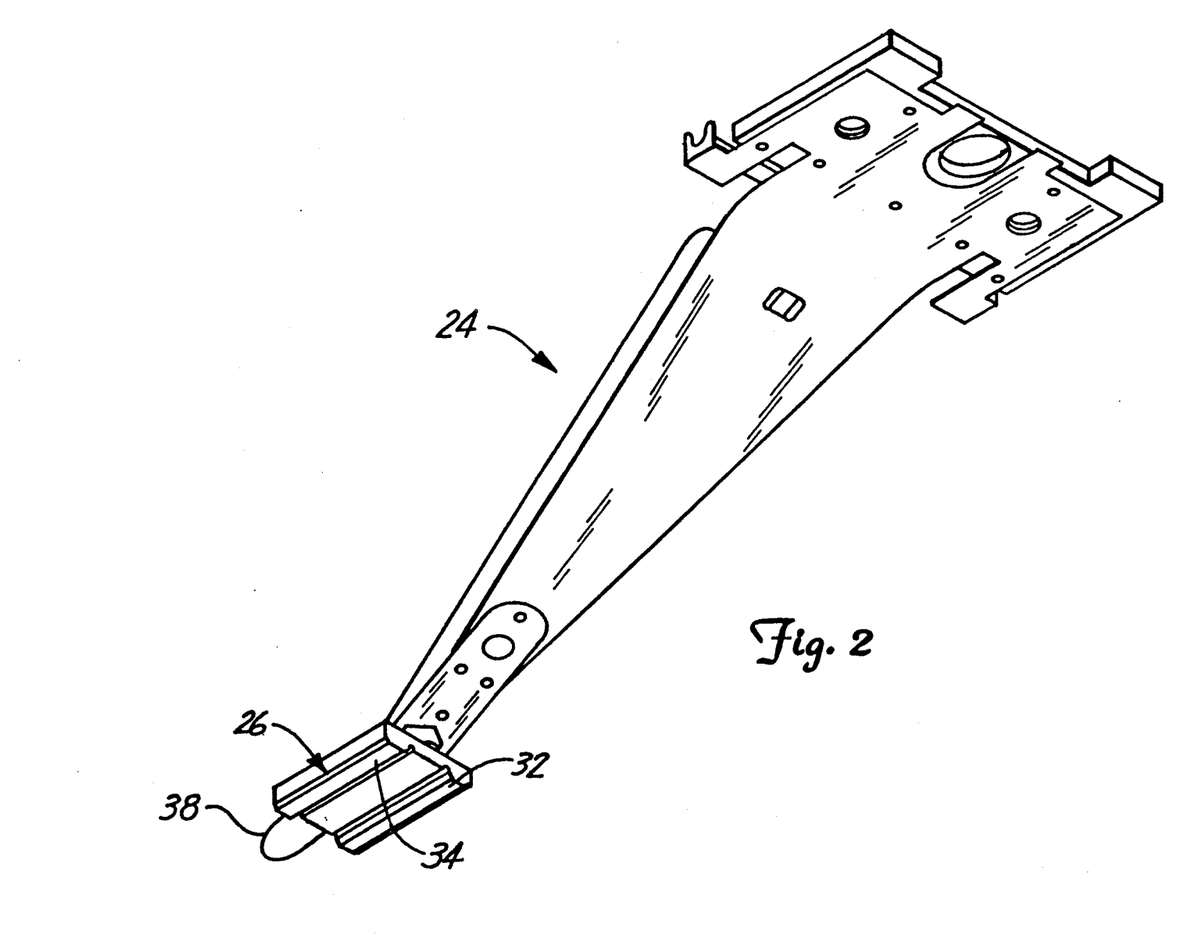
FIG. 2 is a perspective view of a flexure arm and a slider.

FIG. 2 is a perspective view of flexure arm 24 and slider 26. Slider 26 includes rails 32 and 34. Rails 32 and 34 contribute to the aerodynamic properties of slider 26. Slider 26 also carries a magnetoresistive sensor (not shown in FIG. 2) made in accordance with the present invention.

Slider 26 flies above surface 16 of magnetic storage disk 12. The flying action is due to the aerodynamic properties of slider 26 as magnetic storage disk 12 rotates at high speed. It is desirable to have slider 26 exhibit high stability during flight so that slider 26 can fly close to the surface of magnetic storage disk 12 without actually contacting surface 16 as the magnetic storage disk 12 rotates. When magnetic storage system 16 is not in operation, slider 26 is "landed" upon surface 20 of magnetic storage disk 12. Typically, the landing is done along an inner track 18 of magnetic storage disk 12. Upon power-up of magnetic storage system 10, slider 26 "takes-off" from surface 16 of magnetic storage disk 12. During take-off, magnetic storage disk 12 begins rotation from stop position. Rotation of magnetic storage disk 12 causes air movement to flow over surface 16 of magnetic storage disk 12. This air movement is experienced by the interface surface of slider 26. The aerodynamic properties of slider 26 cause a force to be exerted against spring-loaded flexure arm 24 of arm 14. As the rotation of magnetic storage disk 12 reaches a sufficient speed, the force exerted against flexure arm 24 by slider 26 is great enough to cause slider 26 to lift-off, or take-off, from surface 16 of magnetic storage disk 12. At this point, slider 26 begins flying above surface 16 of magnetic storage disk 12. It continues flying until rotation of magnetic storage disk 12 is stopped and slider 26 again lands upon surface 16 of magnetic storage disk 12.

Figure 3:
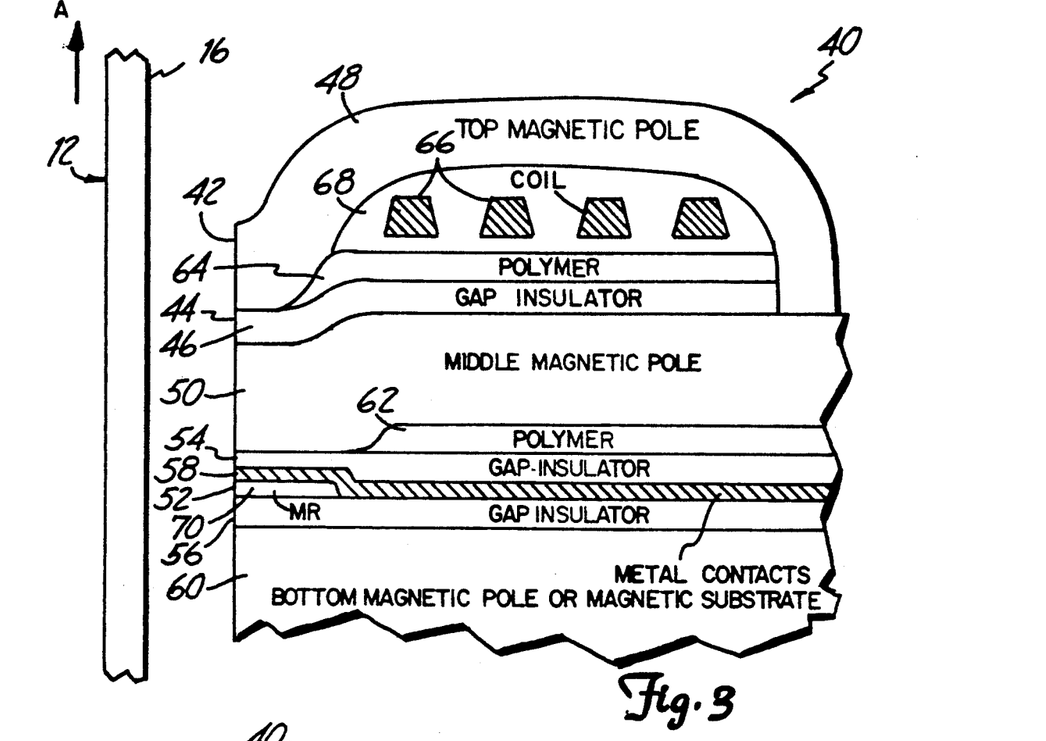
FIG. 3 is a cross-sectional view of a double gap magnetoresistive head which illustrates orientation of the head with respect to a magnetic storage disk.

FIG. 3 illustrates a double gap magnetoresistive sensor 40 in a disk drive environment. Magnetoresistive sensor 40 has an air bearing surface 42 which meets exacting tolerances for flatness and degree of polish, and which is machined with the magnetoresistive sensor 40 held in a magnetic chuck. Air bearing surface 42 is formed by lapping magnetoresistive sensor 40.

Air bearing surface 42 faces a surface 16 of magnetic storage disk 12. Magnetic storage disk 12 travels in a direction relative to magnetoresistive sensor 40 as indicated by arrow A. A spacing between air bearing surface 42 and disk surface 16 is preferably minimized while avoiding contact between magnetoresistive sensor 40 and magnetic disk 12. A write gap 44 is defined on air bearing surface 42 by a gap insulator layer 46 between terminating ends of a top magnetic pole 48 and a middle magnetic pole 50. A sense gap 52 is defined on air bearing surface 42 by gap insulator layers 54 and 56, and metal contact layer 58 between terminating ends of middle magnetic pole 50 and bottom magnetic pole or magnetic substrate 60. Typically, the bottom magnetic pole 60 is NiZn ferrite. However, the bottom magnetic layer could be formed from permalloy or sendust material, or other appropriate magnetic material. An optional polymer layer 62 overlays a portion of gap insulator layer 54 away from air bearing surface 42.

Middle magnetic pole 50, preferably a ferromagnetic material, overlays polymer layer 62 and gap insulator layer 54. Write gap insulator layer 46 and polymer layers 64 and 68 space middle magnetic pole 50 from top magnetic pole 48. Top magnetic pole 48 is also a ferromagnetic alloy which typically comprises permalloy. Electrically conductive coils 66 are provided for generating magnetic fields across write gap 44 and are positioned in a polymer layer 68. A magnetoresistive layer 70 is positioned between gap insulator layer 56 and metal contact 58.

Figure 4:
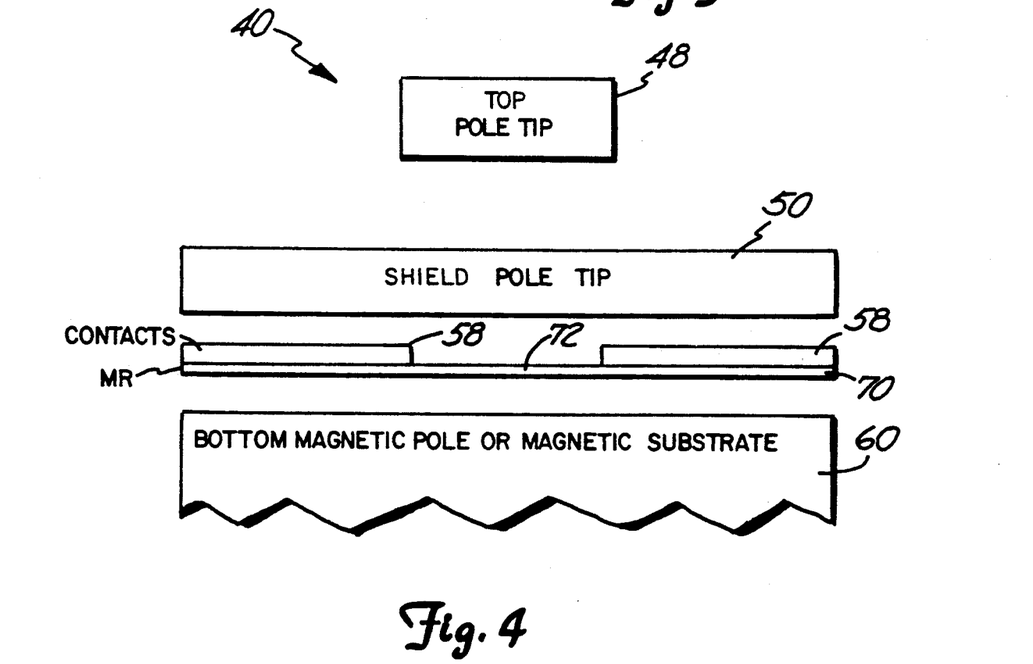
FIG. 4 is an end view of magnetically significant elements of a double gap magnetoresistive head.

FIG. 4 illustrates the location of magnetically significant components of magnetoresistive sensor 40 as they appear looking toward air bearing surface 42. Spacing and insulating air layers are omitted for clarity. Bottom magnetic pole or substrate 60 and middle magnetic pole 50 are spaced and provide a shielded gap in which a magnetoresistive sensor element 72 is disposed. Magnetoresistive sensor element 72 comprises that portion of magnetoresistive layer 70 between metal contacts 58 which define the width of sensor 72. Top magnetic pole 48 is depicted as being of substantially less width and about the same thickness as middle magnetic pole 50. This arrangement protects magnetoresistive sensor element 72 from interference arising from stray magnetic fields generated across the write gap between top pole 48 and middle pole 50.

Figure 5:
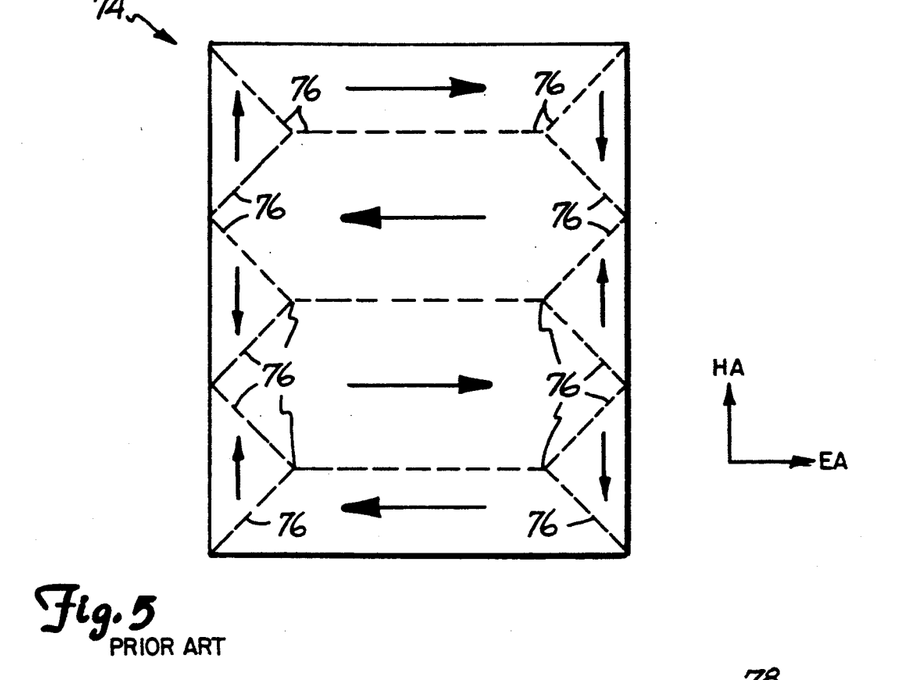
FIG. 5 shows a prior art magnetic shield for a magnetoresistive head.

FIG. 5 is a diagram of a prior art magnetic shield 74 used for shielding a magnetoresistive sensor element in a magnetoresistive sensor. Shield 74 shields a magnetoresistive element in a manner similar to the configuration shown in FIG. 4. Magnetic shield 74 includes domain walls 76. Domain walls 76 separate magnetic domains. The direction of the magnetic fields of the magnetic domains are illustrated by the arrows shown in FIG. 5. The small triangular domains along the side of magnetic shield 74 are referred to as closure domains. Magnetic shield 74 has a hard axis of magnetization in the direction illustrated by the arrow labeled HA and an easy axis direction of magnetization in the direction indicated by the arrow labeled EA. The purpose of a magnetic shield is to magnetically isolate the magnetoresistive sensor element from stray, external, magnetic fields. A magnetic shield also acts as a magnetic mirror for the top pole (48 in FIG. 4) to complete a magnetic circuit for the inductive magnetic head which is used to write magnetically encoded information upon the surface of a magnetic storage disk. By proper process control, a simple rectangular shield can be fabricated which stabilizes the desired domain structure shown on magnetic shield 74 of FIG. 5. If magnetic shield 74 is subjected to weak, external magnetic fields (for example, magnetic fields which are less than 10 Oersteds), than the magnetic domain pattern depicted in FIG. 5 is not destroyed.

However, if the magnetic shield 74 of FIG. 5 is subjected to large external magnetic fields, the magnetic domain pattern is destroyed. For example, during magnetoresistive sensor fabrication, a number of process steps require large easy axis fields which may exceed 100 Oersteds. These large fields easily saturate magnetic shield 74 in the easy axis direction. When these large fields are reduced to zero, the generic rectangular shield geometry develops a degenerate, unpredictable and undesired magnetic domain structure which can interfere with the proper operation of the magnetoresistive sensor. Furthermore, if a magnetic setting procedure is used in which the magnetoresistive sensor element is subjected to an external magnetic setting field, these fields can destroy the desired magnetic domain pattern shown in FIG. 5. Additionally, during assembly of a magnetic disk drive, a magnetoresistive sensor may be subjected to moderate magnitude magnetic fields in the range of about 10 Oersteds to about 100 Oersteds which may also destroy the magnetic domain pattern. Therefore, typically following completion of the manufacturing process of a magnetoresistive sensor, the desired magnetic domain pattern associated with the magnetic shield illustrated in FIG. 5 has been lost.

Figure 6:
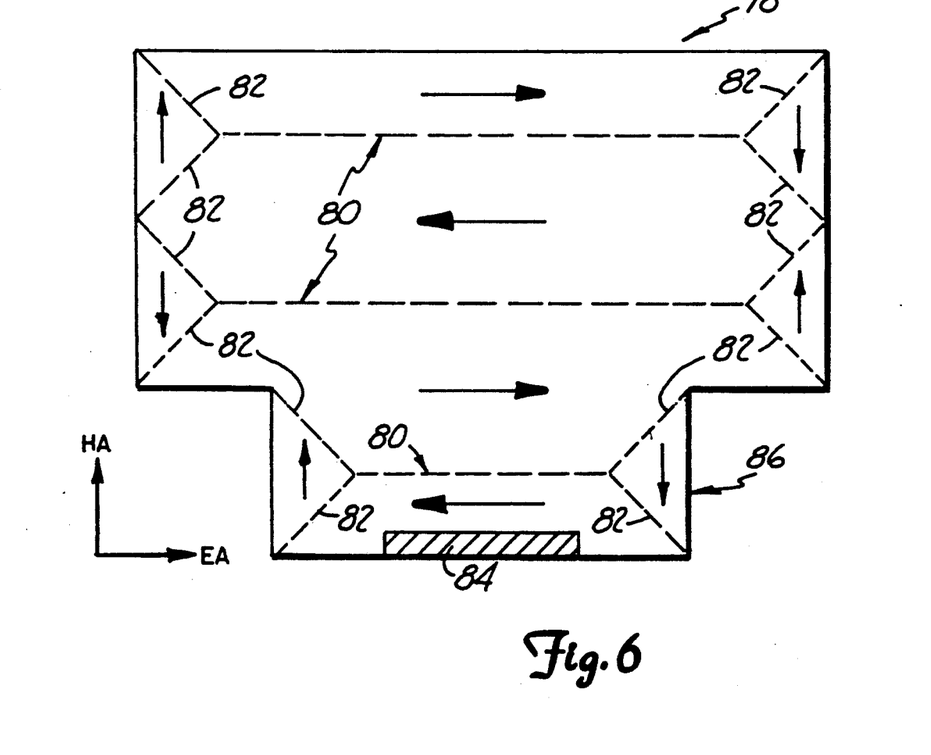
FIG. 6 shows a magnetic shield made in accordance with the present invention for use with a magnetoresistive head.

FIG. 6 shows a magnetic shield 78 for use with a magnetoresistive head (such as magnetoresistive sensor 40 of FIG. 3) made in accordance with the present invention. Dashed lines 80 and 82 depict 180 degree and 90 degree domain walls respectively. Arrows in the magnetic domains shown in FIG. 6 on magnetic shield 78 indicate the typical direction of the magnetization within the domains. 90 degree domain walls 82 bound the closure domain which lie along two sides of magnetic shield 78. The middle pole 78 overlays a magnetoresistive (72 in FIG. 4) which is indicated by crosshatching. In comparison with prior art magnetic shield 74 of FIG. 5, magnetic shield 78 of FIG. 6 includes a lip portion 86 in the vicinity of sensor carrying portion 84.

Magnetic shield 78 of FIG. 6 made in accordance with the present invention provides the boundaries for the highly stable magnetic domain pattern which is not destroyed after magnetic shield 78 is subjected to high level magnetic fields in the easy axis direction. The present invention stabilizes a magnetically quiet single domain zone around the magnetoresistive sensor element. There are no extraneous magnetic fields which perturb the magnetoresistive sensor element due to undesired domain walls of magnetic shield 78. Even if a magnetic field is applied in the easy axis direction which exceeds the coercivity point of magnetic shield 78, the domain pattern depicted in FIG. 6 returns to its preferred, hard axis direction once the external magnetic field is reduced to zero. Lip 86 is formed having a height approximately equal to the equilibrium periodicity of the closure domains.

Figure 7:
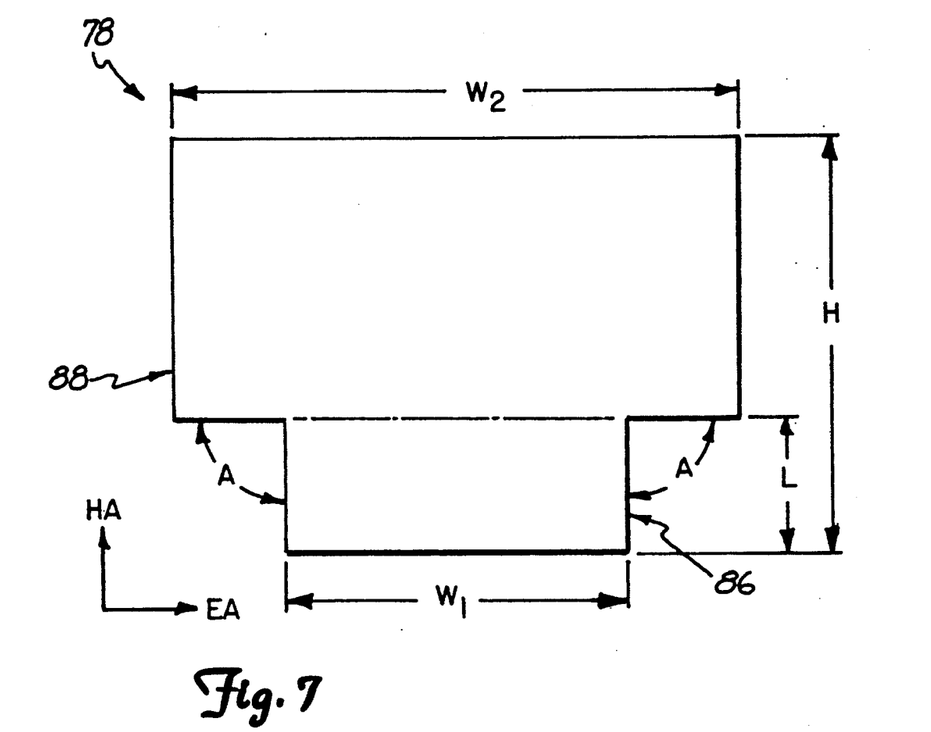
FIG. 7 illustrates various dimensional parameters of a magnetic shield made in accordance with the present invention for use in a magnetoresistive sensor.

FIG. 7 is a diagram of magnetic shield 78 of FIG. 6 which include labels on various dimensions. In FIG. 7, $W_1$ is the front width of magnetic shield 78. The front width is the width of shield 78 along the air bearing surface. Magnetoresistive element 72 shown in FIG. 4 is positioned adjacent along the tip of magnetic shield 78 along the portion having a width $W_1$. $W_2$ is the back width of magnetic shield 78. The back width is the width of magnetic shield 78 along the edge opposite the front edge of the shield. H is the total height of magnetic shield 78. H is the distance between the front edge and the back edge of magnetic shield 78. L is the height of lip 86 and is less than the total height H. The angle between lip portion 86 and a main body portion 88 of magnetic sensor 78 is labeled A. Angle A close to 90 degrees is highly desirable, e.g. $75° \leq A \leq 108°$.

The configuration of magnetic shield 78 shown in FIG. 7 provides a highly stable magnetic domain structure. In a preferred embodiment of the present invention, $W_2$, $W_2$, H and L are within a predetermined range. If $W_1$ and $W_2$ are greater than about 25 microns, the magnetostriction, $\lambda$, should greater than or equal to zero and in the range of about 0 to about $0.5 \times 10^{-6}$. This prevents closure domains along the front and back edges of magnetic shield 78. A negative magnetostriction is undesirable with these dimensions. Narrower widths ($W_1$ and $W_2$) tend to require a negative magnetostriction to stabilize the desired domain structure.

Furthermore, the lengths H and L may be defined based upon the equilibrium periodicity of the magnetic domain pattern of the magnetic shield T, of the thin film process used to fabricate the magnetic shield 78. In particular, H/T should be a small integer, e.g. from about one to about five. Furthermore, L/T should be about equal to one. In other words, the height of lip 86 should approximate the periodicity of magnetic shield 78.

The width of the front edge, $W_1$, should be greater than the length of magnetoresistive sensor 72 (shown in FIG. 4). The distance that main body 88 extends beyond the edge of lip 86 ($W_2$ minus $W_1$) can be set by other design constraints. The thickness of magnetic shield 78, t, should be greater than about 2 microns. A thicker shield will provide more stability to the domain structure.

In the present invention, when an external easy axis field is removed from magnetic shield 78, the de-magnetization fields from the edges of lip 86 along height L "re-initialize" the structure into its preferred pattern shown in FIG. 6. The height of the lip 86 should be about equal to the equilibrium perodicity of the magnetic domain pattern of the magnetic shield. The preferred domain is re-initialized even after a setting magnetic field is applied to the magnetoresistive head. Lip 86 increases the demagnetization sufficiently so that when the external field is released, the de-magnetization overcomes the coercivity in the region and re-establishes the hard axis domain structure.

In a preferred embodiment of the present invention using typical plated permalloy, H, the total height of magnetic shield 78 from the front edge to the back edge is about 250 microns. The height of lip 86, L, is about 25 microns. The front width, $W_1$, is about 150 microns and the back Width, $W_2$, is about 200 microns. The thickness, t, is about 3 microns. The magnetostriction is about $0.3 \times 10^{-6}$.

Figure 8:
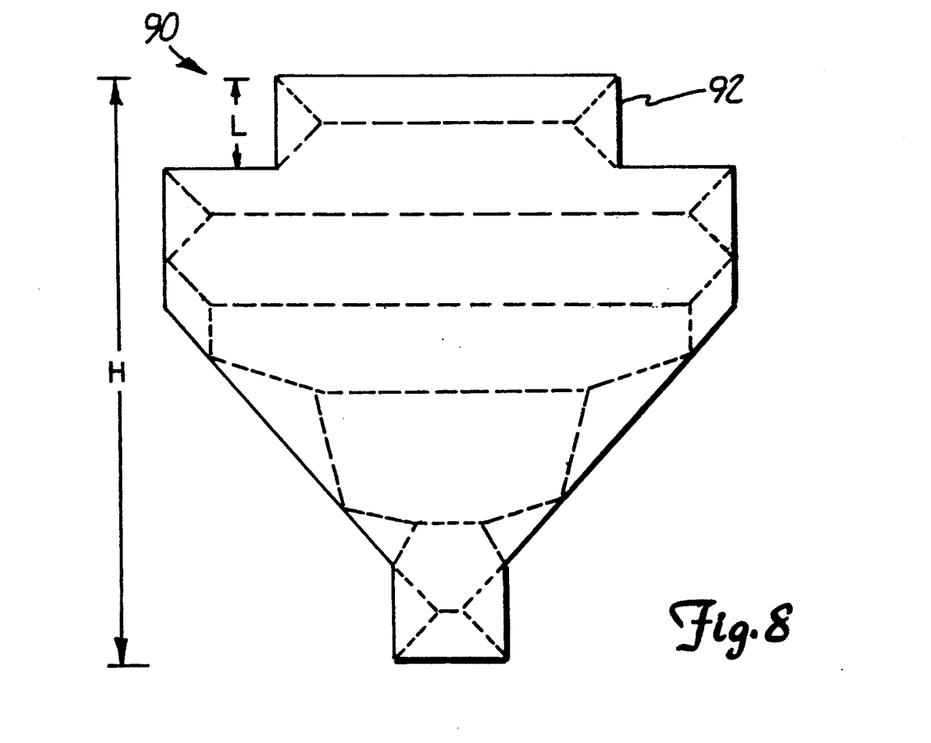
FIG. 8 shows a magnetic pole made in accordance with the present invention for use in an inductive thin film magnetic head.

FIG. 8 shows a pole 90 of an inductive thin film magnetic head made in accordance with the present invention. (Pole 90 of FIG. 8 is similar to pole 48 of FIG. 3). Pole 90 includes a lip 92 in the back gap region. Back gap lip 92 has a length approximately equal to the length of the equilibrium periodicity of the preferred magnetic domain pattern of thin film pole 90. H is approximately an even multiple of the length of back gap lip 92. Back gap lip 92 stabilizes a region of magnetic pole 90 which is typically very unstable in prior art designs. By stabilizing the back gap region, noise introduced into a readback signal due to spontaneous shifting of the magnetic domain pattern of pole 90 is reduced. Following a writing operation in which a write field is applied to pole 90, the stabilizing demagnetization effect introduced by back gap lip 92 returns the magnetic domain pattern of pole 90 to its stable, easy axis pattern.

The present invention provides a means for stabilizing the magnetic domain pattern of a magnetic shield in a magnetoresistive head. In the present invention a lip is provided which has a height about equal to the equilibrium periodicity of the magnetic domain pattern of the magnetic shield. In addition, the overall height of the magnetic shield is a multiple of the length of the lip. The magnetostriction of the material should be slightly positive when the width of the magnetic shield is greater than about 25 microns. However, the desired magnetostriction is negative for narrower widths. The thickness of the magnetic shield should be greater than about 2 microns. The lip provides a de-magnetization effect which returns the domain pattern to its desired state after easy axis saturation and re-establishes the hard axis domain structure. Thus, following the manufacturing process for a magnetoresistive head, during which the magnetic shield is subjected to large magnetic fields, the domain structure will return to its preferred hard axis domain structure. The preferred hard axis domain structure provides a highly stable and reliable magnetoresistive head.

Although the present invention has been described with reference to preferred embodiments, workers skilled in the art will recognize that changes may be made in form and detail without departing from the spirit and scope of the invention. For example, the present invention may be applied to other thin film structures such as the pole pieces in an inductive thin film head to provide stabilization of the magnetic domain pattern. Again, for example, different magnetic materials and alternate processing techniques might require different lip height L in order to stabilize the desired hard axis domain structure in the vicinity of the magnetoresistive sensor.

What is claimed is:

1. An apparatus comprising:
   a magnetoresistive sensor having a long axis and a height in the direction of the long axis;
   a shield located adjacent to the magnetoresistive sensor and having a height, the shield comprising a magnetic material having a magnetic domain pattern; and
   a lip associated with the magnetic shield and adjacent to the magnetoresistive sensor, said lip including at least a portion of each of two magnetic domains which have substantially equal equilibrium periods, and wherein said lip has a length in the direction of the long axis substantially equal to the equilibrium period of each of the magnetic domains of said lip.

2. The apparatus of claim 1 wherein the magnetic shield has a magnetostriction greater than or equal to zero.

3. The apparatus of claim 2 wherein the magnetostriction is about 0 to about $0.5 \times 10^{-6}$.

4. The apparatus of claim 1 wherein the magnetic shield carries less than about 20 closure domains.

5. The apparatus of claim 1 wherein the magnetic shield has a front width associated with the lip, the front width being greater than the width of the magnetoresistive sensor.

6. The apparatus of claim 1 wherein the magnetic shield has a thickness of greater than about 2 microns.

7. The apparatus of claim 1 wherein the height of the lip is about 25 microns, the magnetic shield has a height of about 250 microns, the lip has a width of about 150 microns, the magnetic shield has a back width opposite the lip of about 250 microns, the magnetic shield has a thickness of about 3 microns, and the magnetic shield has a magnetostriction of about $0.3 \times 10^{-6}$.

8. A magnetic storage system comprising:
   a magnetic storage disk for storing magnetically encoded information on a surface;
   a support arm proximate the magnetic storage disk for moving relative to the surface of the magnetic storage disk;
   a transducer coupled to the support arm, for reading and writing magnetically encoded information upon the surface of the magnetic storage disk, comprising:
- a magnetoresistive sensor element for sensing magnetically encoded information carried upon the surface of the magnetic storage disk;
- electrical contacts coupled to the magnetoresistive sensor element;
- a magnetic shield adjacent the magnetoresistive sensor element for magnetically isolating the magnetoresistive sensor element from stray magnetic fields, the shield having a height and comprising a magnetic material having a magnetic domain pattern; and
- a lip associated with the magnetic shield and adjacent to the magnetoresistive sensor element, said lip including at least a portion of each of two magnetic domains which have substantially equal equilibrium periods, and wherein said lip has a length in the direction of the long axis substantially equal to the equilibrium period of each of the magnetic domains of said lip.

9. The magnetic storage system of claim 8 wherein the magnetic shield has a magnetostriction greater than or equal to zero.

10. The magnetic storage system of claim 9 wherein the magnetostriction is about 0 to about $0.5 \times 10^{-6}$.

11. The magnetic storage system of claim 8 wherein the magnetic shield carries less than about 20 closure domains.

12. The magnetic storage system of claim 8 wherein the magnetic shield has a front width associated with the lip, the front width greater than a width of the magnetoresistive sensor element.

13. The magnetic storage system of claim 8 wherein the magnetic shield has a thickness greater than about 2 microns.

14. The magnetic storage system of claim 8 wherein the height of the lip is about 25 microns, the magnetic shield has a height of about 250 microns, the lip has a width of about 150 microns, the magnetic shield has a back width opposite the lip of about 250 microns, the magnetic shield has a thickness of about 3 microns, and the magnetic shield has a magnetostriction of about $0.3 \times 10^{-6}$.

15. The magnetic storage system of claim 8 wherein the transducer includes an inductive thin film magnetic element for writing information upon the surface of the magnetic storage disk.

* * * * *